(12) United States Patent
Lyon

(10) Patent No.: US 6,898,151 B1
(45) Date of Patent: May 24, 2005

(54) ACOUSTIC PULSE ECHO RANGING SYSTEM

(75) Inventor: Quinton Lyon, Peterborough (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 0 days.

(21) Appl. No.: 09/419,923

(22) Filed: Oct. 18, 1999

(30) Foreign Application Priority Data

Oct. 21, 1998 (GB) .............................................. 9823059

(51) Int. Cl.⁷ .............................................. G01S 15/06
(52) U.S. Cl. ...................................................... 367/99
(58) Field of Search ................. 367/908, 99; 73/290 V; 340/621; 702/55, 54

(56) References Cited

U.S. PATENT DOCUMENTS

| | | | | |
|---|---|---|---|---|
| 4,188,608 A | * | 2/1980 | Richard | ........................ 367/97 |
| 4,282,589 A | * | 8/1981 | Evetts et al. | ................. 367/100 |
| 4,308,599 A | * | 12/1981 | Thiele | ........................... 367/92 |
| 4,439,845 A | * | 3/1984 | Geohegan et al. | ........... 367/101 |
| 4,894,661 A | * | 1/1990 | Furuno et al. | ............... 342/140 |

FOREIGN PATENT DOCUMENTS

| | | | |
|---|---|---|---|
| GB | 2 054 851 A | | 2/1981 |
| GB | 2 191 055 A | | 12/1987 |
| GB | 2306003 A | * | 4/1997 |
| GB | 2342996 A | * | 4/2000 |

* cited by examiner

*Primary Examiner*—Daniel Pihulic
(74) *Attorney, Agent, or Firm*—Ridout & Maybee LLP

(57) ABSTRACT

A method of operating a pulse echo ranging system comprising a transducer assembly for providing transmission and reception of high frequency energy pulses at substantially different plural frequencies. The method uses signals received by the transducer assembly to generate an echo profile for signals received at at least a first of the frequencies to enhance the recovery of data beyond that obtained from the first signal alone.

8 Claims, 2 Drawing Sheets

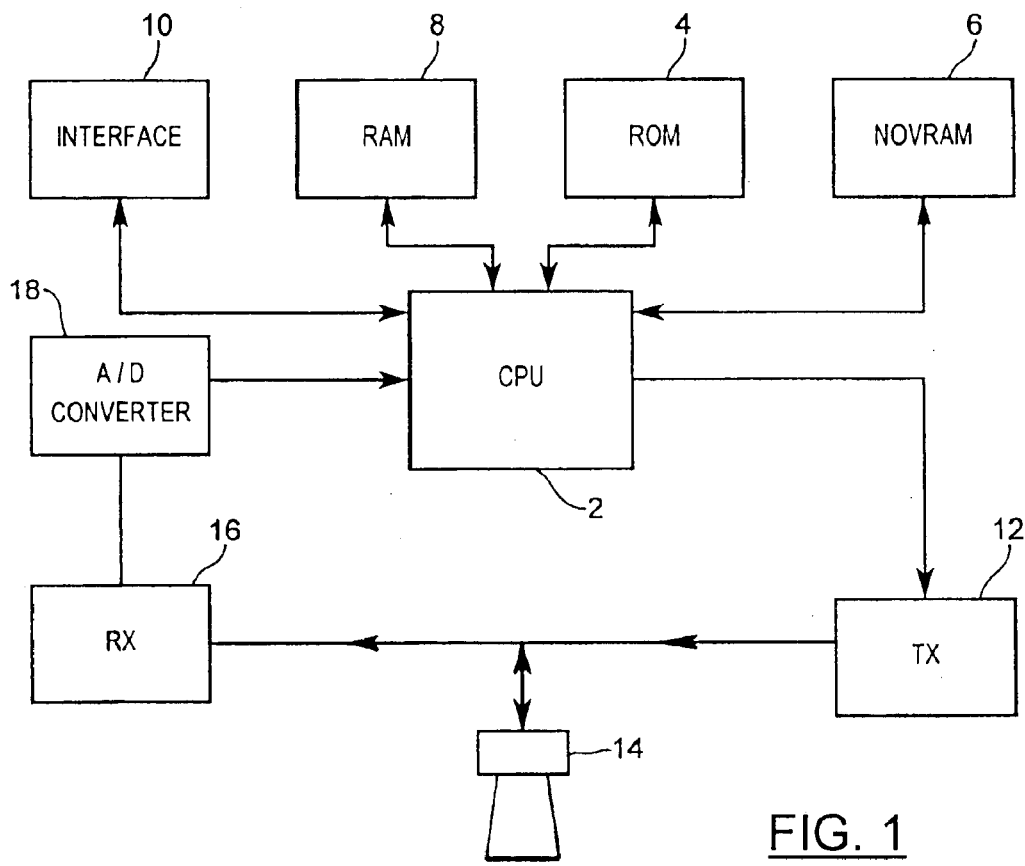
FIG. 1
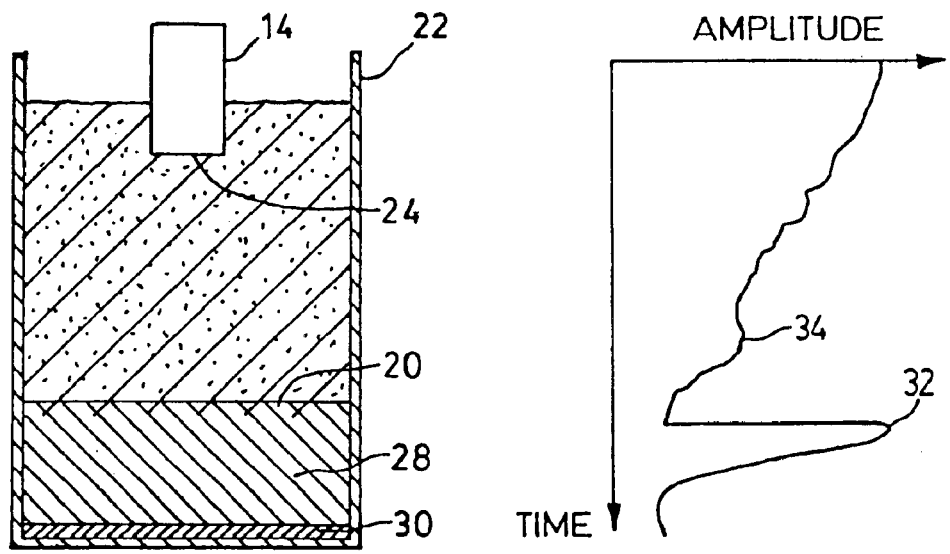
FIG. 2
FIG. 3

ACOUSTIC PULSE ECHO RANGING SYSTEM

FIELD OF THE INVENTION

This invention relates to pulse echo ranging systems, and more particularly although not exclusively to systems for monitoring the level of sludge in a body of liquid.

BACKGROUND OF THE INVENTION

In a number of applications, it is necessary to monitor liquids containing significant quantities of suspended materials, which materials may tend to separate or accumulate as a separate phase beneath a body of clearer liquid. A parameter which it is frequently desired to monitor is the level of the interface between settled material or sludge, and a supernatant liquid.

Suspended material in liquids tends to reflect or disperse acoustic energy, although the extent of this effect is frequency dependent. The effectiveness of a pulse echo ranging system in determining the position of an interface between a sludge layer and a supernatant liquid will depend upon the presence of suspended material, including gas bubbles, in the supernatant layer, and the concentration and nature of particles in the sludge layer. It is difficult to select a transducer frequency which will provide reliable detection of the interface under all circumstances.

Since transducers used in such systems will normally operate submerged, there is the possibility of build-up of material passing out of suspension and liquid and building up on the transducer assembly. Such build-up can be inhibited by ultrasonic insonification of vulnerable surfaces, particularly the radiating surface of the transducer assembly, but in practice, the most effective frequencies for operation of the transducer, if it is to be self-cleaning, often fall in a different range from those providing best detection of the sludge/liquid interface.

UK Patent Application 2054851A discloses a sonar system using multiple frequencies, one of which is generated by the beating of two closely spaced higher frequencies. UK Patent Application 2191055A dicloes a radar system operating at two substantially different frequencies in order to detect flocks of birds.

SUMMARY OF THE INVENTION

According to the invention, a method of operating a pulse echo ranging system comprises operating a transducer assembly to provide transmission and reception of pulses of high frequency energy at plural substantially different frequencies, and signals received by the transducer assembly are to generate an echo profile for signals received at at least a first of the frequencies, and utilizing the signal at another of the frequencies to enhance the recovery of data beyond that obtained from the first signal alone.

This enhancement may be achieved in various ways. Of two frequencies, one may be used to generate an echo profile and the other to clean the radiating surface of the transducer to maintain efficiency. If echo profiles are recovered for two or more frequencies, the additional profiles may be utilized to enhance the reliability of recovery wanted data. For example, if supernatant liquid contains large quantities of suspended material, acoustic energy at a frequency best suited to detecting a sludge interface may be so attenuated before reaching the interface that detection is not practicable. In this case, the lower frequency signal may provide additional penetration in order to detect the sludge interface and thus improve reliability.

Furthermore, if two or more echo profiles are recovered, the profile recovered from a signal which is not heavily reflected by a sludge interface or other interface which it is desired to detect may be utilized as a reference signal against which echoes occurring in the echo profile from a signal at a different frequency may be assessed.

Alternatively, the profiles from different frequencies may be summed, or differenced on the basis that the response from an interface to be detected to signals at substantially different frequencies will be substantially different.

If the echo responses at different frequencies are available, it may be possible to deduce characteristics such as quantities of suspended solids, layer density, presence of bubbles, and so on from the different responses to the different frequencies.

These various features may of course be used in combination, according to the manner in which a microcontroller controlling the system is programmed.

Further features of the invention will become apparent from the following description with reference to the accompanying drawings.

SHORT DESCRIPTION OF THE DRAWINGS

FIG. 1 is a simplified schematic diagram of a pulse echo ranging system;

FIG. 2 is a section through a settling tank illustrating an exemplary operational environment for the mechanism;

FIG. 3 is a graph illustrating an exemplary echo profile produced by a signal component at one of the frequencies utilized;

Figure 4:
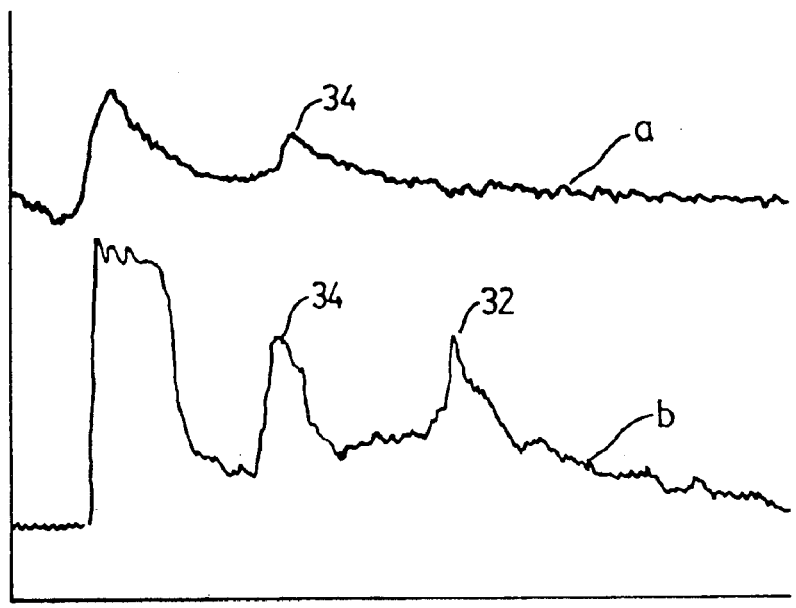
Figure 5:
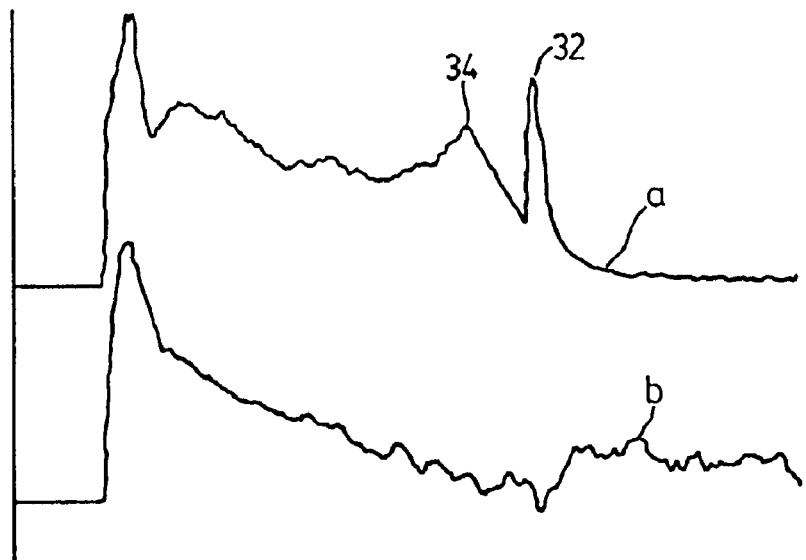
Figure 6:
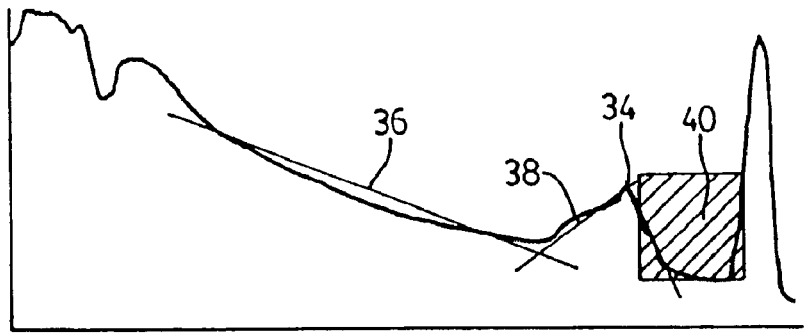

FIG. 4 compares echo responses at two different frequencies in a primary clarifier;

FIG. 5 compares echo response at the two different frequencies in a secondary clarifier;

FIG. 6 is an annotated graph illustrating how echo data may be interpreted to provide additional data.

DESCRIPTION OF THE PREFERRED EMBODIMENT

Referring to FIG. 1, there is shown a simplified schematic diagram of a pulse echo ranging system controlled by a central processing unit (CPU) 2. Typically the CPU 2 will be incorporated in a microcontroller implementing peripheral functions used to implement some of the other blocks shown in FIG. 1 as well as additional functions not described. The CPU operates under a control program stored in read-only memory (ROM) 4, utilizing parameters stored in non-volatile random access memory (NOVRAM) 6, and provided with working memory in the form of random access memory (RAM) 8. An interface 10 provides for the export of data from the unit, and the import of operating parameters. Data may be exported in the form of a display, telemetry signals or alarm signals. The CPU 2 also controls a transmitter 12 which controls the timing, frequency and amplitude of high frequency pulses applied to a transducer 14. A receiver 16 receives return echo signals from the same or a different transducer, amplifies them, usually logarithmically, and applies them to an analog to digital converter 18, from where the digital echo profile is stored in RAM 8 for further processing.

The operation of such systems is described in more detail in our U.S. Pat. Nos. 4,596,144; 4,831,565; 4,890,266;

4,999,998 and 5,076,751, and only features of difference will be discussed further below.

Referring to FIG. 2, this shows an exemplary application of the invention, used for monitoring a sludge interface 20 in a tank 22, of the invention, in which the transducer 14 is mounted with at least its radiating face 24 submerged in the liquid content of the tank. Above the interface 20, the liquid content is liquid containing suspended material and possibly gas bubbles, while a denser sludge phase 28 settles out beneath the interface and above the bottom wall 30 of the tank.

FIG. 3 illustrates an exemplary echo response to a high frequency acoustic pulse emitted by the transducer 14. In this instance there is a strong echo 32 from the bottom of the tank, while the weaker true echo 34 from the interface 20 shows little increase in amplitude relative to the immediately preceding portion of the profile which consists not only of a component due to ranging of the transducer, but also energy reflected by the suspended material in the liquid above the interface. This reflected energy tends to mask the wanted echo.

These phenomena are illustrated further in FIGS. 4 and 5, which show how the responses to different pulse frequencies can change in different environments. Graphs a and b in each Figure represent logarithmic plots of the amplitude of the echo profiles produced at 44 kHz and 150 kHz respectively in a tank acting as a primary clarifier and a tank acting as a secondary clarifier. In FIG. 4, the lower frequency (trace b) propagates well through liquid containing substantial amounts of suspended material, and clear echoes 32 and 34 can be seen both from the bottom of the tank and the sludge interface. At the higher frequency (trace a), absorption and scattering result in the echo 34 being much less marked, and the echo 32 being wholly absent. By contrast, behaviour in the secondary clarifier is quite different. In this case the suspended material is light and "fluffy". It is penetrated well by the higher frequency (trace a), providing clear echoes 32 and 34 from the bottom of the tank and the sludge interface, whereas the lower frequency is severely attenuated and produces no recognizable echoes.

In a presently preferred embodiment, both frequencies are generated simultaneously by a common acoustic transducer.

Piezoelectric transducers used in acoustic ranging systems are commonly capable of resonating in different modes having substantially different resonant frequencies, and the transmitter 12 is configured to generate energy at two such widely spaced frequencies such as to cause the transducer to radiate at both frequencies during a pulse. For best results, the frequencies should have at least 2:1 ratio. Exemplary frequencies are 44 kHz and 150 kHz, or 50 kHz and 120 kHz. It is possible to use more than two frequencies, or to use a transducer assembly containing multiple piezoelectric elements having different frequencies, or to energize the transducer at different frequencies sequentially. It is also possible to utilize a transducer assembly comprising two separate transducers, for example two acoustic transducers operating at different frequencies. In some applications, it may be possible to combine an acoustic microwave transducer so as to exploit the different penetration and dispersion characteristics of the different types of radiation involved, for example, in applications where it is desired to detect both a foam interface and a liquid interface in a tank with the transducer assembly above both levels.

Regardless of the transmitter and transducer system used, there are various ways of using the invention to provide enhanced performance. At a lowest level, a higher frequency is used to generate an echo response for analysis, and acoustic energy at a lower frequency is used to inhibit deposition of solids on a radiating surface of the transducer assembly thus improving reliability. Preferably however, echo responses are obtained at each frequency and combined in some manner to provide enhanced data.

For example, the echo responses may simply be summed, providing a combined response in which echoes of energy occurring at any of the frequencies will normally be apparent. Even though one frequency fails to provide a substantial echo response from a feature of interest, the second frequency may result in a satisfactory response. An alternative or additional approach is to difference the responses at two frequencies. The resulting combined response will then represent the differences between the reflective behaviour of targets at the two frequencies and may enable distinct echo responses to be detected where the summary approach fails. A frequency which does not provide good echo responses may nonetheless be used as a reference against which to detect peaks or discontinuities in response at another frequency.

Comparing responses at different frequencies may permit further characteristics of liquid in a vessel to be determined, since the response to different types of suspended material at different frequencies is different. Referring to FIG. 6, a portion of the echo profile 36 consists of reverberation from suspended particles in the supernatant liquid, a portion 38 preceding the peak 34 from the sludge interface represents enhanced reflection from "fluff" of particle gathering above the interface, while the sharply depressed portion 40 of the response between the peak 34 and the peak 32 representing the reflection from the bottom of the tank represents high absorptive properties of the sludge beneath the interface. It will also be noted that the actual peak 34 due to reflection at the interface is quite small, but the peak is emphasized by the sharply contrasting reflective properties of the layers on either side of the peak. At a higher frequency, the reverberation from the suspended particles will typically be greater, and while the reflection from the interface may produce a more marked peak, this may be masked to a greater extend by reverberation. On the other hand, the reflection and dispersion by the fluff may be substantially less. These differing responses may permit substantial interpretation of systems whose characteristics have been the subject of empirical observation.

What is claimed is:

1. A method of operating a pulse echo ranging system comprising the steps of:

providing a transducer assembly operable to send and receive high frequency acoustic energy;

transmitting, through the transducer assembly, at least two energy pulses having substantially different frequencies;

receiving reflected echoes of the at least two energy pulses at the transducer assembly and converting the reflected echo signals to received signals; and combining the received signals to provide enhanced data.

2. A method according to claim 1, wherein the received signals are summed.

3. A method according to claim 1, wherein the received signals are differenced.

4. A method according to claim 1, wherein a signal received at a second frequency is used as a reference against which the first signal can be compared to provided enhanced data.

5. A method of operating a pulse echo ranging system comprising the steps of:

providing a transducer assembly operable to send and receive high frequency acoustic energy;

transmitting, through the transducer assembly, at least two energy pulses having substantially different frequencies;

receiving reflected echoes of the at least two energy pulses at the transducer assembly and converting the reflected echo signals to received signals; and summing the received signals to provide enhanced data.

6. A method of operating a pulse echo ranging system comprising the steps of:

providing a transducer assembly operable to send and receive high frequency acoustic energy;

transmitting, through the transducer assembly, a first energy pulse and a second energy pulse, the second energy pulse having a frequency at least twice that of the first energy pulse;

receiving reflected echoes of the first and second energy pulses at the transducer assembly and converting the reflected echo signals to received signals; and combining the received signals to provide enhanced data.

7. A method according to claim 6, wherein the received signals are summed.

8. A method according to claim 6, wherein the received signals are differenced.

\* \* \* \* \*